UNITED STATES PATENT OFFICE.

JOSEPH H. DEACON, OF LUMBERTON, NEW JERSEY.

IMPROVEMENT IN THE MANUFACTURE OF ALCOHOLIC LIQUORS FROM THE RHUBARB PLANT.

Specification forming part of Letters Patent No. 86,284, dated January 26, 1869; reissue No. 3,837, dated February 15, 1870; reissue No. 4,606, dated October 24, 1871.

*To all whom it may concern:*

Be it known that I, JOSEPH H. DEACON, of Lumberton, in the county of Burlington and State of New Jersey, have invented certain Improvements in a Process of Manufacturing a Whisky or Brandy from the Juice of the Rhubarb Plant, of which the following is a specification:

The nature and object of the invention will appear from the following description:

The first part of my invention relates to the process of making the alcoholic beverage above mentioned. The second is the product of the process. The stalks and stems of the rhubarb plant are to be thoroughly cleansed by washing, and then ground, and the juice or sap thoroughly expressed from the ground mass. This may be done in any suitable manner. I make no claim for the manner of doing that. To every three gallons of the juice so expressed I add one gallon of water, and afterward about three pounds of sugar for each gallon of the compound of juice and water. The sugar, however, may be dispensed with, at pleasure. After the above-described compound has undergone fermentation for about one week and that process has been completed, the cask containing it should be bunged up and kept still for two or three weeks; and then the liquid should be drawn off into other casks and stored away for a sufficient time, which I consider about one year; and then it may be subjected to the ordinary process of distillation. The product will be an alcoholic liquor which is not only a pleasant beverage, but is quite useful and suitable for medicinal purposes.

I claim as my invention—

1. The described process of manufacturing an alcoholic liquor from the juice of the rhubarb plant, substantially as set forth.

2. An alcoholic liquor manufactured from the juice of the rhubarb plant, substantially as described.

JOSEPH H. DEACON.

Witnesses:
ELLSWORTH HOLEMAN,
RICHARD P. HOLEMAN.

(47)